(12) United States Patent
Seong

(10) Patent No.: US 11,747,234 B2
(45) Date of Patent: Sep. 5, 2023

(54) LIQUID LEAK SENSOR AND METHOD OF FABRICATING THE SAME

(71) Applicant: Beak Myeong Seong, Seongnam-si (KR)

(72) Inventor: Beak Myeong Seong, Seongnam-si (KR)

( * ) Notice: Subject to any disclaimer, the term of this patent is extended or adjusted under 35 U.S.C. 154(b) by 511 days.

(21) Appl. No.: 17/032,750

(22) Filed: Sep. 25, 2020

(65) Prior Publication Data

US 2022/0065737 A1    Mar. 3, 2022

(30) Foreign Application Priority Data

Sep. 1, 2020    (KR) ........................ 10-2020-0111013

(51) Int. Cl.
| | |
|---|---|
| *G01M 3/40* | (2006.01) |
| *B29C 67/04* | (2017.01) |
| *B29K 27/18* | (2006.01) |
| *B29K 105/16* | (2006.01) |
| *B29K 105/00* | (2006.01) |
| *B29K 507/04* | (2006.01) |

(52) U.S. Cl.
CPC .............. *G01M 3/40* (2013.01); *B29C 67/04* (2013.01); *B29K 2027/18* (2013.01); *B29K 2105/162* (2013.01); *B29K 2105/251* (2013.01); *B29K 2507/04* (2013.01)

(58) Field of Classification Search
CPC ........... G01M 3/00; G01M 3/40; B29C 67/04; B29K 2027/18; B29K 2105/162; B29K 2105/251; B29K 2507/04
See application file for complete search history.

(56) References Cited

FOREIGN PATENT DOCUMENTS

| CN | 111823619 A | * | 10/2020 | ............. B32B 27/32 |
|---|---|---|---|---|
| KR | 101544855 B1 | * | 8/2015 | ............. G01M 3/16 |
| KR | 10-2084721 B1 | | 3/2020 | |

* cited by examiner

*Primary Examiner* — Nguyen Q. Ha
(74) *Attorney, Agent, or Firm* — Rabin & Berdo, P.C.

(57) ABSTRACT

The present disclosure relates to a method of fabricating a liquid leak sensor and, more particularly, to a method of fabricating a liquid leak sensor, which is cheap and can be easily fabricated by consecutively disposing a nonconductive layer and a conductive layer and compressing the layers. The method may include shaping a nonconductive mold article having a flat top surface and bottom surface using nonconductive powder, shaping a conductive mold article having a flat top surface and bottom surface using a conductive raw material, alternately stacking the nonconductive mold article and the conductive mold article on a die up and down, shaping a single compressed article by applying pressure to the stacked nonconductive mold article and conductive mold article up and down using presses, sintering the molded compressed article, and performing skiving processing on a side of the sintered compressed article to a given thickness.

15 Claims, 4 Drawing Sheets

(a)

(b)

LIQUID LEAK SENSOR AND METHOD OF FABRICATING THE SAME

BACKGROUND

1. Technical Field

The present disclosure relates to a liquid leak sensor and a method of fabricating the same, and more particularly, to a liquid leak sensor, which is cheap and can be easily fabricated by consecutively disposing a non-conductive layer and a conductive layer and then performing skiving processing on a mold article shaped by pressing the layers using a press, and a method of fabricating the same.

2. Related Art

Korean Patent No. 10-2084721 (capacitance leakage sensor) issued to this applicant has a structure for detecting various types of leaking water, conductive and nonconductive chemical solutions, oil and organic solvents. The structure has a "structure including a base film made of a material having excellent drug-tolerance and chemical-resistance properties and a pair of conductive lines formed on a top surface of the base film at an interval and configured to form capacitance based on the area and interval of the conductive lines, wherein each of the conductive lines includes three metal layers, a first layer of the lowest layer is formed using copper by etching, a second layer formed on the first layer has a nickel-copper layer formed therein by a plating method, and a third layer is formed on the second layer using a gold plating method."

Accordingly, when a leaking liquid is introduced into the adjacent conductive lines, water, a conductive or nonconductive chemical solution, oil or an organic solvent can be determined based on a change in the capacitance value.

The capacitance leakage sensor is also applied to a detection device for detecting a liquid-leaking state based on a change in electrical conductivity or resistance value of a leaking liquid not the capacitance value.

However, according to such a conventional technology, the capacitance leakage sensor has very excellent conductivity because the conductive lines are fabricated by forming a conductive metal material, such as copper, nickel-copper or gold, on the top surface of the base film using the plating method. However, the capacitance leakage sensor has problems in that the number of repeated uses is limited because the capacitance leakage sensor is easily corroded and peeled off if it comes into contact with a chemical solution, such as an alkali solution or an acid solution, and an error of a detection signal frequently occurs due to the corrosion, and has disadvantages of a very cumbersome manufacturing process and a high price.

If the conductive lines are formed using a carbon material according to a method such as printing, the conductive lines are less vulnerable to the chemical solution compared to the metal material. In this case, there is a problem in that a protection film for protecting the conductive lines is easily peeled off due to a step between the base film and the conductive lines if the protection film is stacked on the base film.

PRIOR ART DOCUMENT

1. Korean Patent No. 10-2084721 (capacitance leakage sensor)

SUMMARY

An embodiment of the present disclosure is to provide a liquid leak sensor, which is fabricated by shaping a cylindrical compressed article formed by alternately stacking a nonconductive mold article and a conductive mold article on a cylindrical die and then compressing the mold articles using a press, sintering the compressed article, and then performing skiving processing on the sintered articles to a given thickness along the side portion of the sintered article, and a method of fabricating the same.

In an embodiment, a liquid leak sensor wherein a conductive layer is sintered and located on a side of a nonconductive layer made of a nonconductive material and the nonconductive layer and the conductive layer are alternately sintered and located at least once.

Furthermore, in an embodiment, a method of fabricating a leak liquid leak sensor includes a first process of shaping a nonconductive mold article having a flat top surface and bottom surface using nonconductive powder, a second process of shaping a conductive mold article having a flat top surface and bottom surface using a conductive raw material, a third process of alternately stacking the nonconductive mold article and the conductive mold article on a die up and down, a fourth process of shaping a single compressed article by applying pressure to the stacked nonconductive mold article and conductive mold article up and down using presses, a fifth process of sintering the molded compressed article, and a sixth process of performing skiving processing on a side of the sintered compressed article to a given thickness.

The nonconductive layer or the conductive powder is made of poly tetra fluoro ethylene (PTFE). The conductive layer or the conductive raw material is made of a raw material in which the PTFE and a carbon nano tube (CNT) are mixed.

DESCRIPTION OF REFERENCE NUMERALS

Figure 1:
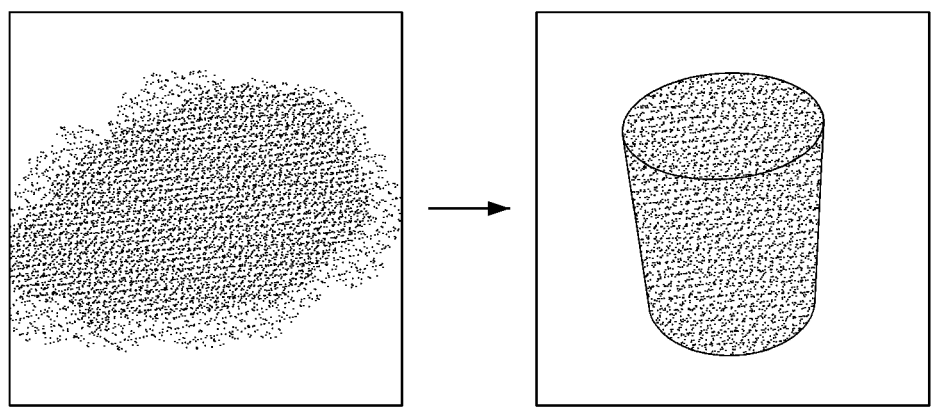
FIGS. 1 to 3 are diagrams for describing a process of fabricating a liquid leak sensor according to an embodiment of the present disclosure.

100: die
110: lower press
120: upper press
210,230,250: nonconductive mold
220,240: conductive mold
300: liquid leak sensor
310,330,350: nonconductive layer
320,340: conductive layer
400: skiving machine

DETAILED DESCRIPTION

The aforementioned objects, characteristics, and merits are described in detail with reference to the accompanying drawings, and thus a person having ordinary skill in the art to which the present disclosure pertains may readily practice the technical spirit of the present disclosure.

In describing the present disclosure, a detailed description of a known art related to the present disclosure will be omitted if it is deemed to make the gist of the present disclosure unnecessarily vague.

Common terms which are now widely used are selected as terms used in the present disclosure by taking into consideration functions in the present disclosure, and the terms may be different depending on an intention of a technician skilled in the art, a precedent, or the advent of a new technology.

Furthermore, in a specific case, some terms are randomly selected by the applicant. In this case, the meaning of a corresponding term will be described in detail in a descriptive part of a corresponding invention.

Accordingly, terms used in the present disclosure should not be simply defined based on their names, but should be defined based on their substantial meanings and contents over the present disclosure.

Hereinafter, embodiments of the present disclosure are described in detail with reference to the accompanying drawings.

However, the embodiments of the present disclosure may be modified in various other forms, and the scope of the present disclosure is not limited to the following embodiments.

The embodiments of the present disclosure are provided to a person having ordinary knowledge in the art to more fully describe the present disclosure.

Figure 2:
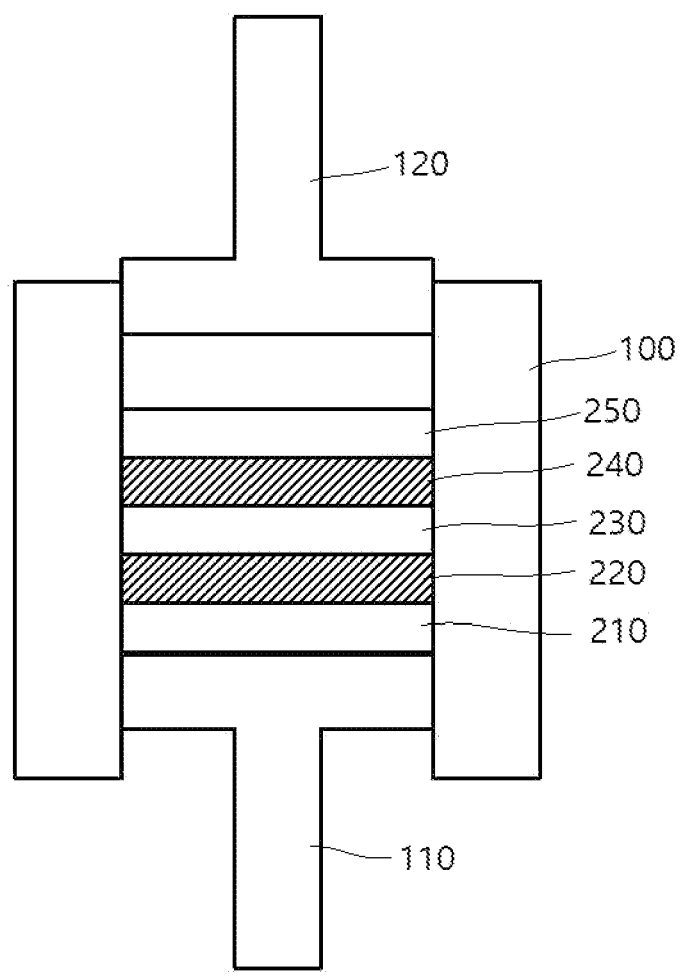
Figure 3:
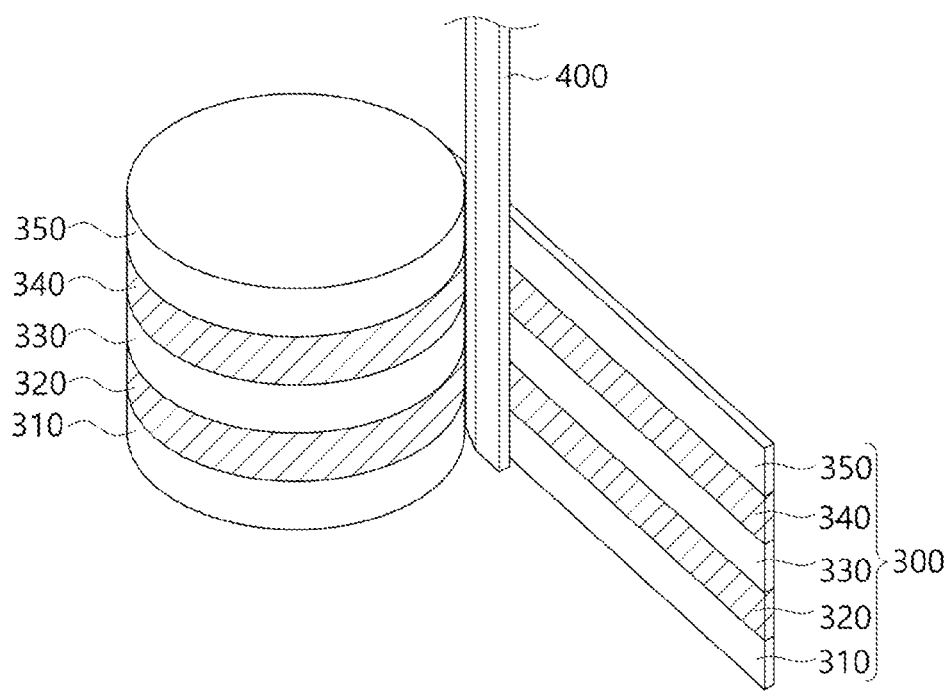
Figure 4:
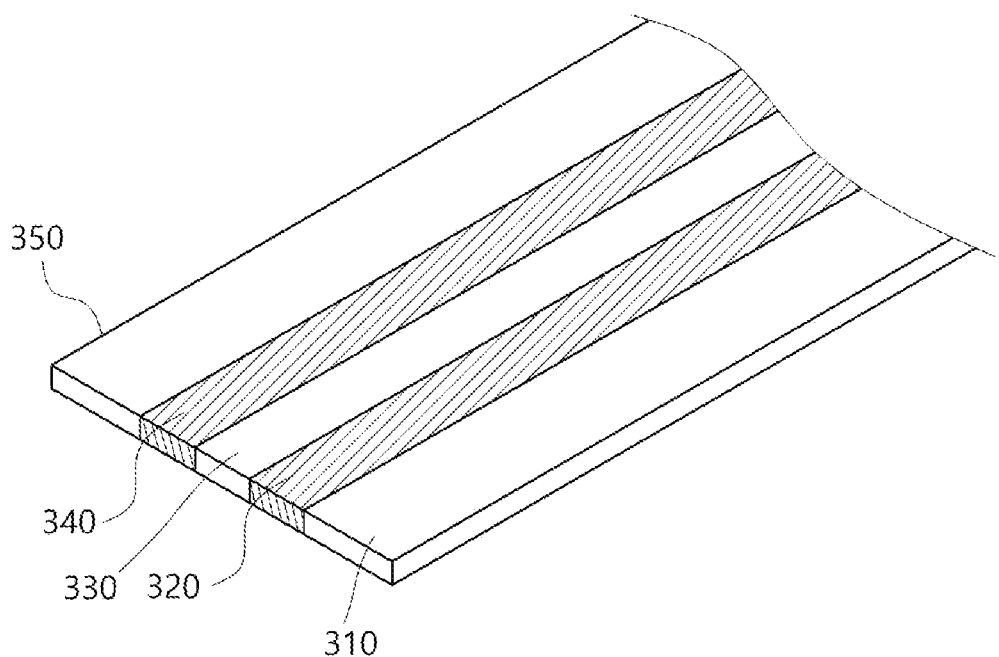
FIG. 4 is a diagram illustrating the structure of the liquid leak sensor according to an embodiment of the present disclosure.
Figure 5:
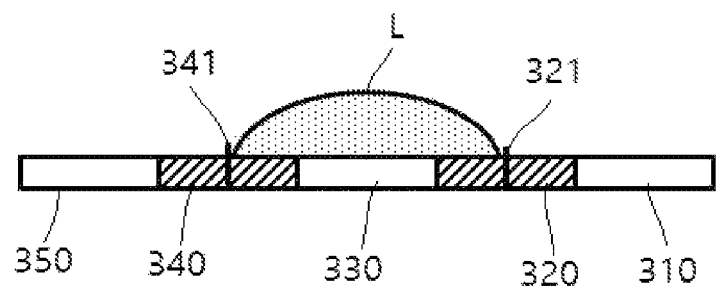
FIG. 5 is a diagram illustrating a lateral cross section of the liquid leak sensor according to an embodiment of the present disclosure.
Figure 5:
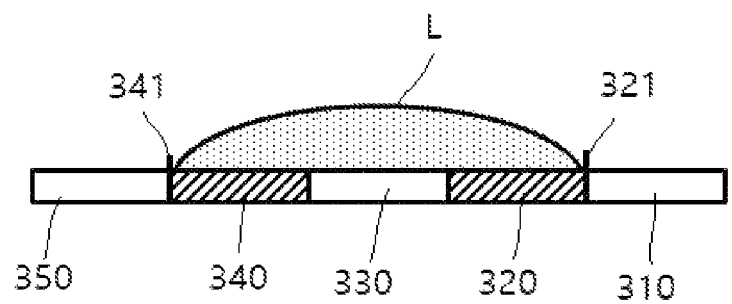

FIGS. 1 to 3 are diagrams for describing a process of fabricating a liquid leak sensor according to an embodiment of the present disclosure. FIG. 4 is a diagram illustrating the structure of the liquid leak sensor according to an embodiment of the present disclosure. FIG. 5 is a diagram illustrating a lateral cross section of the liquid leak sensor according to an embodiment of the present disclosure.

Figure 6:
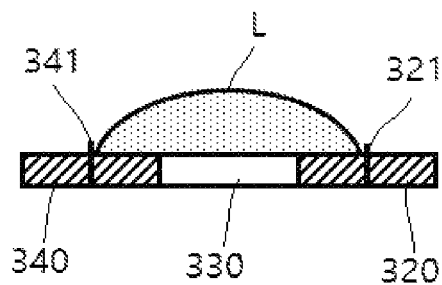
FIG. 6 is a diagram illustrating another form of the liquid leak sensor.
Figure 7:
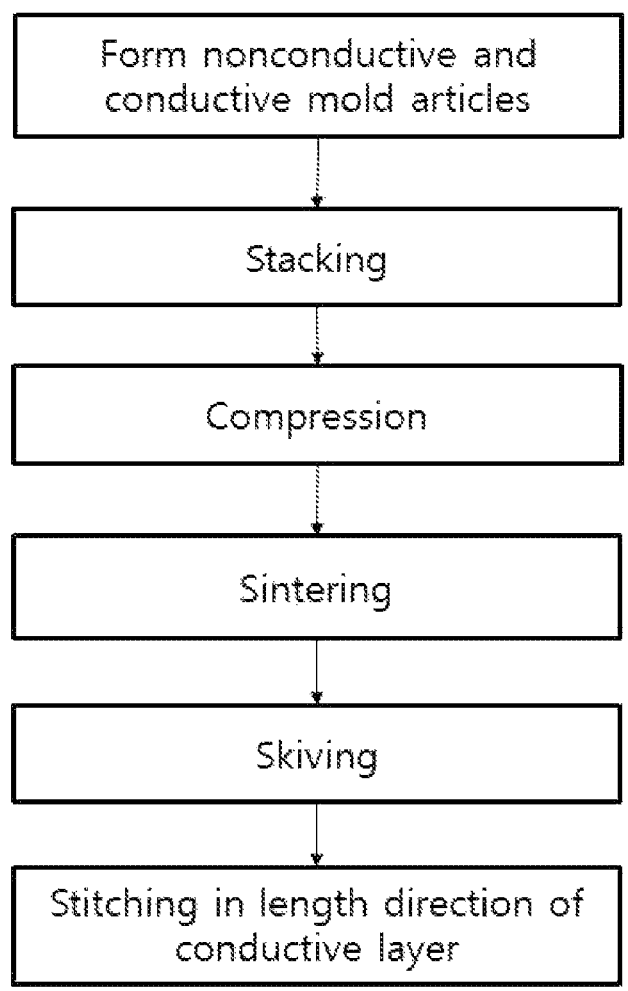
FIG. 7 is a flowchart illustrating a method of fabricating a liquid leak sensor.

FIG. 6 is a diagram illustrating another form of the liquid leak sensor. FIG. 7 is a flowchart illustrating a method of fabricating a liquid leak sensor.

In order to fabricate the liquid leak sensor according to an embodiment of the present disclosure, first, as illustrated in FIG. 1, a cylindrical nonconductive mold article having a flat top surface and bottom surface is fabricated using nonconductive powder. The nonconductive powder may include poly tetra fluoro etylene (PTFE) powder having a drug-tolerance property and a chemical-resistance property.

Various materials having powder forms, such as a fluorinated ethylene propylene copolymer (FEP), perfluoroalkoxy (PFA), and edthylene tetra fluoro ethylene (ETFE), in addition to the PTFE may be used as the nonconductive powder.

In an embodiment of the present disclosure, an example in which the PTFE powder is used has been described, but the present disclosure is not limited thereto.

The conductive mold article stacked on the nonconductive mold article is shaped using the PTFE powder and a carbon nano tube (CNT). After the PTFE powder 10~30 weight %, a multi-wall carbon nano tube (MWCNT) 1~10 weight %, an organic solvent 59.9~88.1 weight %, and a metal coupling agent 01~09 weight % are input and stirred, the organic solvent is removed, and the remaining mixture is dried at a low temperature and formed to have a cylindrical shape having a flat top surface and bottom surface, like the nonconductive mold article.

The CNT is made of carbon, and has a tube form having a diameter of a nano size. The CNT has characteristics of high heat/electrical conductivity, high strength, and chemical stability. A material, such as grapheme, may be used in addition to the CNT.

The PTFE has high electrical conductivity, that is, a characteristic of the CNT while maintaining a unique characteristic by the coupling of the PTFE and CNT.

The nonconductive mold article and the conductive mold article are alternately stacked within a die 100 having a cylindrical shape as illustrated in FIG. 2. A first nonconductive mold article 210 is positioned on a lower press 110 inserted into the lower side of the die 100. A first conductive mold article 220 is stacked on the first nonconductive mold article 210. A second nonconductive mold article 230 is stacked on the first conductive mold article 220.

Furthermore, a second conductive mold article 240 is stacked on the second nonconductive mold article 230. A third nonconductive mold article 250 is stacked on the second conductive mold article 240.

Furthermore, a conductive mold article and a nonconductive mold article may be alternately stacked on the third nonconductive mold article 250. In this case, the number of conductive lines formed by the conductive mold article may be increased as required.

When the nonconductive mold articles and the conductive mold articles are stacked as described above, a single cylindrical compressed article is formed by pressurizing the lower press 110 and the upper press 120.

The compressed article has a state in which the nonconductive mold articles and the conductive mold articles have not yet been firmly bonded. Accordingly, the nonconductive mold articles and the conductive mold articles are bonded by sintering. Since the nonconductive mold article is formed using the PTFE and the conductive mold article also contains the PTFE, the nonconductive mold articles and the conductive mold articles are easily sintered and bonded by the same material.

As a result, the bonding according to the sintering is easily performed only when the nonconductive mold article and the conductive mold article are formed using the same material.

A process of previously shaping the nonconductive mold article in a cylindrical shape and inputting the shaped nonconductive mold article into the die 100 has been described. However, as another form, the PTFE powder may be directly stacked.

That is, after PTFE powder is stacked at the same height instead of the first conductive mold article 210, the top surface of the PTFE powder is made flat. The second conductive mold article 220 is stacked on the PTFE powder. Thereafter, PTFE powder is stacked on the second conductive mold article 220 and made flat.

The nonconductive powder may be stacked instead of the nonconductive mold article by repeating such a process.

Thereafter, after the cylindrical compressed article is formed by applying pressure using the lower press 110 and the upper press 120 and then sintered, the nonconductive powder and the conductive mold articles are bonded together.

In the cylindrical compressed article formed as described above, as illustrated in FIG. 3, a first nonconductive layer 310 is formed from the lowest side by the first nonconductive mold article 210. A first conductive layer 320 is bonded and stacked by the first conductive mold article 220. A second nonconductive layer 330 is formed by the second nonconductive mold article 230. A second conductive layer 340 is bonded and stacked by the second conductive mold article 240. Furthermore, a third nonconductive layer 350 is formed by the third nonconductive mold article 250.

If skiving processing is performed on the cylindrical compressed article to a given thickness from an outer circumference surface using a skiving machine 400, a liquid leak sensor 300 having a long and stripe form is formed as illustrated in FIG. 4.

That is, the side portions of the first nonconductive layer 310, the first conductive layer 320, the second nonconductive layer 330, the second conductive layer 340, and the third nonconductive layer 350 are laterally sintered and bonded. The second nonconductive layer 330 plays an insulation role between the first and second conductive layers 320 and 340. The first nonconductive layer 310 and the third nonconductive layer 350 located at the outermost sides protect the side portions of the first and second conductive layers 320 and 340 so that the side portions are not exposed to the outside.

Accordingly, as illustrated in FIG. 5, the first conductive layer 320 and the second conductive layer 340 are positioned in parallel while maintaining an interval therebetween by the second nonconductive layer 330, and thus function as electrodes. Accordingly, when a leaked solution L is positioned on the top surface of the first conductive layer 320 and the second conductive layer 340, the leakage state of the solution L can be detected using a capacitance method, a resistance method, or an electrical conductivity method.

Since the bottom surface and top surface of the liquid leak sensor 300 have a flat state by the skiving processing, an adhesion member to be attached to the bottom of the liquid leak sensor 300 can be attached to the bottom surface without being lifted off. Furthermore, the protection film can be closely attached to the top surface.

That is, as in a conventional technology, if the conductive line is formed on the top surface of the base film, the protection film is easily lifted off and peeled off due to a step between the base film and the conductive line. In an embodiment of the present disclosure, however, the protection film can be attached very stably because the nonconductive layers 310, 330, and 350 and the conductive layers 320 and 340 are flatly formed at the same height.

The nonconductive layers 310, 330, and 350 and the conductive layers 320 and 340 contain the PTFE and thus surfaces thereof have very smooth lubricity. Accordingly, when the leaked solution L is introduced into the top surface, the leaked solution easily slides. This may make it difficult for the leaked solution to be positioned between the conductive layers 320 and 330.

In order to solve such a problem, as illustrated in FIG. 5(a), threads 321 and 341 made of a PTFE material are backstitched in the length direction of the conductive layers 320 and 340. Accordingly, the tops of the backstitched threads 321 and 341 are positioned higher than a surface of the conductive layers 320 and 340.

Therefore, the leaked solution L is positioned with it confined between the backstitched threads 321 and 341. As a result, the leaked solution L can be detected very easily by the conductive layers 320 and 340 because the leaked solution L runs down.

The backstitching of the threads 321 and 341 may be performed in the length direction of the conductive layers 320 and 340. Alternatively, as illustrated in FIG. 5(b), the threads 321 and 341 may be formed at outer edge portions of the conductive layers 320 and 340, that is, in the length direction between the first conductive layer 320 and the first nonconductive layer 310 and between the second conductive layer 340 and the third nonconductive layer 350.

The threads 321 and 341 have been described as being made of the PTFE material, but may be formed using various materials, such as a fluorinated ethylene propylene copolymer (FEP), perfluoroalkoxy (PFA), or edthylene tetra fluoro ethylene (ETFE) having a drug-tolerance property and a chemical-resistance property, in addition to the PTFE.

FIG. 6 is a diagram illustrating another form of the liquid leak sensor 300. The liquid leak sensor 300 may have a structure in which the conductive layers 320 and 340 are positioned in parallel on both sides of the second nonconductive layer 330.

In this case, the two conductive layers 320 and 340 can maintain a given interval and can be insulated because the second nonconductive layer 330 is positioned between the two conductive layers 320 and 340 that play a role of electrodes. Furthermore, the liquid leak sensor 300 does not have the five layers as illustrated in FIG. 5, but may have only the three layers, that is, the two conductive layers 320 and 340 and the second nonconductive layer 330. Accordingly, a manufacturing cost can be reduced that much.

Furthermore, the conductive layers 320 and 340 may be backstitched by the threads 321 and 341 in the length direction thereof.

The liquid leak sensor and the method of fabricating the same according to embodiments of the present disclosure have an advantage in that the liquid leak sensor can be fabricated cheaply and very easily because the nonconductive mold article made of the PTFE and the conductive mold article made of the PTFE and the CNT are alternately stacked on the die having a cylindrical shape, the nonconductive mold articles and the conductive mold articles are compressed by the presses to form the single cylindrical compressed article, and the compressed article is sintered and subjected to skiving processing to a given thickness along the side portions of the mold articles.

Furthermore, there are advantages in that since the nonconductive line and the conductive line are sintered, peeling-off does not occur as in a conventional technology and drug-tolerance and chemical-resistance properties are very excellent.

Specific parts of the contents of the present disclosure have been described above. Such detailed descriptions are merely preferred embodiments for those having ordinary knowledge in the art, and it will be evident that the scope of the present disclosure is not restricted by the detailed descriptions.

Accordingly, it may be said that a substantial scope of the present disclosure is defined by the accompanying claims and equivalents thereof.

What is claimed is:

1. A liquid leak sensor, comprising:
  at least two conductive layers; and
  at least one nonconductive layer made of a nonconductive material,
  wherein the nonconductive layer(s) and the conductive layers are sintered and located alternately side by side at least once.

2. The liquid leak sensor of claim 1, wherein:
  one side of a conductive layer is sintered and located on a side of a nonconductive layer,
  one side of another nonconductive layer is sintered and located on the other side of the conductive layer, and
  one side of still another conductive layer is sintered and located on the other side of the another nonconductive layer.

3. The liquid leak sensor of claim 1, wherein the nonconductive layer(s) and the conductive layers are formed to have an identical thickness and each have a flat top surface and a flat bottom surface.

4. The liquid leak sensor of claim 1, wherein:
the nonconductive layer is formed using polytetrafluoroethylene (PTFE), and
the conductive layer is formed using a raw material in which PTFE powder and a carbon nano tube (CNT) are mixed, or a raw material in which the PTFE powder and graphene are mixed, or a raw material in which the PTFE powder, and the CNT and the graphene are mixed.

5. The liquid leak sensor of claim 1, wherein threads are backstitched in a length direction in outward directions of the conductive layer or the conductive layer.

6. A method of fabricating a leak liquid leak sensor, comprising:
a first process of shaping nonconductive mold articles having a flat top surface and a flat bottom surface using a nonconductive powder;
a second process of shaping conductive mold articles having a flat top surface and a flat bottom surface using a conductive raw material;
a third process of stacking alternately the nonconductive mold articles and the conductive mold articles on a die up and down;
a fourth process of shaping a single compressed article by applying pressure to the stacked nonconductive mold articles and conductive mold articles up and down using presses;
a fifth process of sintering the single compressed article; and
a sixth process of performing skiving processing on a side of the sintered single compressed article to a given thickness.

7. A method of fabricating a leak liquid leak sensor, comprising:
a first process of stacking alternately, on a die, mold articles made of a nonconductive powder and mold articles made of a conductive raw material up and down;
a second process of shaping a single compressed article by applying pressure to the stacked mold articles using presses;
a third process of sintering the single compressed article; and a fourth process of performing skiving processing on a side of the sintered single compressed article to a given thickness.

8. The method of claim 6, wherein:
the nonconductive powder is polytetrafluoroethylene (PTFE) powder, and
the conductive raw material is a mixture of the PTFE powder and a carbon nano tube (CNT), or a mixture of the PTFE powder and graphene, or a mixture of the PTFE, the CNT, and the graphene.

9. The method of claim 6, wherein when the nonconductive mold articles and the conductive mold articles are stacked alternately in plural layers, a nonconductive mold article is located on a highest side.

10. The method of claim 6, wherein when the nonconductive mold articles and the conductive mold articles are stacked alternately in plural layers, a conductive mold article is located on lowest and highest sides.

11. The method of claim 6, further comprising a process of backstitching threads having a drug-tolerance property and a chemical-resistance property at a location of the conductive mold articles or in a length direction in an outward direction of the conductive mold articles after the skiving processing.

12. The method of claim 7, wherein:
the nonconductive powder is polytetrafluoroethylene (PTFE) powder, and
the conductive raw material is a mixture of the PTFE powder and a carbon nano tube (CNT), or a mixture of the PTFE powder and graphene, or a mixture of the PTFE, the CNT, and the graphene.

13. The method of claim 7, wherein when the nonconductive mold articles or the nonconductive powder and the conductive mold articles are stacked alternately in plural layers, a nonconductive mold article or the nonconductive powder is located on a highest side.

14. The method of claim 7, wherein when the nonconductive mold articles or the nonconductive powder and the conductive mold articles are stacked alternately in plural layers, a conductive mold article is located on lowest and highest sides.

15. The method of claim 7, further comprising a process of backstitching threads having a drug-tolerance property and a chemical-resistance property at a location of the conductive mold articles or in a length direction in an outward direction of the conductive mold articles after the skiving processing.

* * * * *